(12) United States Patent
Gerdes et al.

(10) Patent No.: US 7,353,610 B2
(45) Date of Patent: Apr. 8, 2008

(54) WHEEL COMPONENT CENTERING SYSTEM FOR VEHICLE SERVICE DEVICES

(75) Inventors: Michael D. Gerdes, St. Peters, MO (US); Dennis Linson, St. Charles, MO (US); Nicholas J. Colarelli, Creve Coeur, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 10/685,009

(22) Filed: Oct. 14, 2003

(65) Prior Publication Data

US 2005/0076519 A1 Apr. 14, 2005

(51) Int. Cl.
G01B 5/24 (2006.01)
(52) U.S. Cl. ..................................... 33/203; 33/203.18
(58) Field of Classification Search ................. 33/203, 33/203.18, 203.19, 203.2, 520, 644, 465, 33/471, 485; 73/484, 487, 462, 482
See application file for complete search history.

(56) References Cited

U.S. PATENT DOCUMENTS

| | | | | |
|---|---|---|---|---|
| 354,595 A * | 12/1886 | Cole | ........................... | 33/557 |
| 575,469 A * | 1/1897 | Fancher | ...................... | 33/673 |
| 1,013,911 A * | 1/1912 | Weber | ........................ | 33/520 |
| 1,524,041 A * | 1/1925 | Leighton | .................... | 73/484 |
| 2,270,657 A * | 1/1942 | Kraft | ............................ | 73/484 |
| 2,631,452 A * | 3/1953 | Hutter | ........................ | 73/484 |
| 3,488,857 A * | 1/1970 | Bateman | .................. | 33/203.18 |
| 3,742,766 A * | 7/1973 | Mitchell | ...................... | 73/484 |
| 3,888,128 A * | 6/1975 | Mitchell | ...................... | 73/484 |
| 4,462,253 A * | 7/1984 | Becher | ....................... | 73/487 |
| 5,174,032 A * | 12/1992 | Beck | ........................... | 33/203 |
| 5,471,754 A * | 12/1995 | Mieling | .................. | 33/203.18 |
| 5,665,911 A | 9/1997 | Warkotsch | | |
| 5,987,761 A | 11/1999 | Ohnesorge | | |
| 6,138,366 A * | 10/2000 | Boess | ....................... | 33/203.18 |
| 6,349,593 B1 * | 2/2002 | Blair | ........................... | 33/288 |
| 6,772,631 B2 * | 8/2004 | Hansen | ........................ | 73/487 |
| 2003/0051548 A1 | 3/2003 | Hansen | | |

* cited by examiner

*Primary Examiner*—G. Bradley Bennett
(74) *Attorney, Agent, or Firm*—Polster, Lieder, Woodruff, & Lucchesi, L.C.

(57) ABSTRACT

A system and method for centered mounting of a rotating body upon a spindle shaft. The system includes a set of double low-tapers cones arranged and identified according to size. A guide is provided to identify an appropriate cone from the set for a given rotating body pilot hole diameter. To secure the rotating body upon the spindle in a centered manner with the selected cone, an infinitely adjustable mounting flange assembly is provided with a set of mounting pins to engage the rotating body in a predetermined spacing with a clamping force against the cone. The mounting flange assembly and set of mounting pins cooperatively provides for infinite adjustment to accommodate a range of symmetrical vehicle wheel lug hole patterns between a minimum radial dimension and a maximum radial dimension.

18 Claims, 10 Drawing Sheets

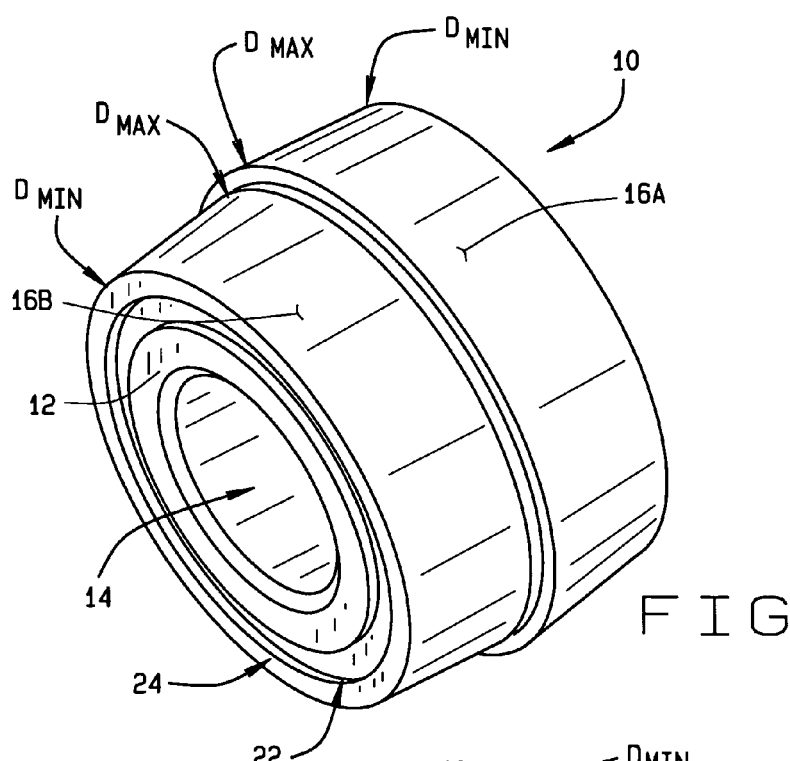
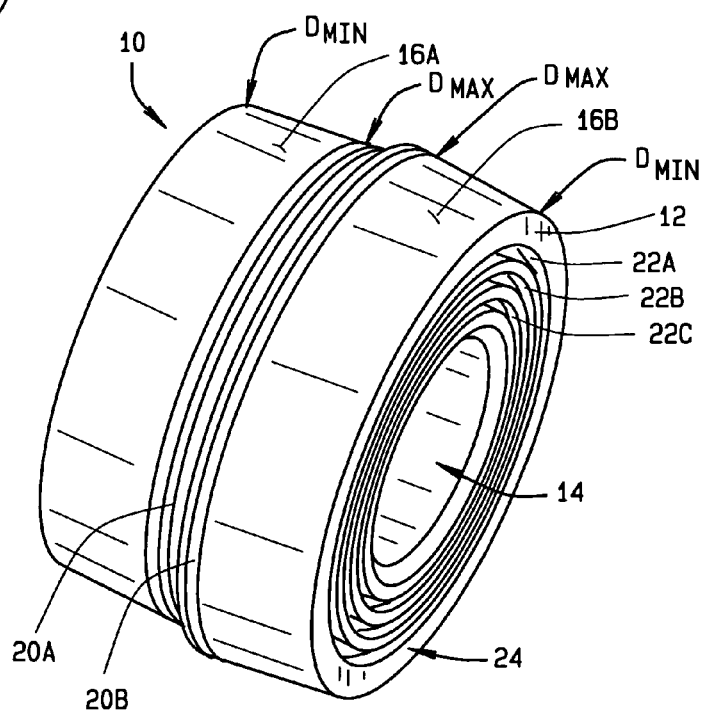
FIG. 1
FIG. 2

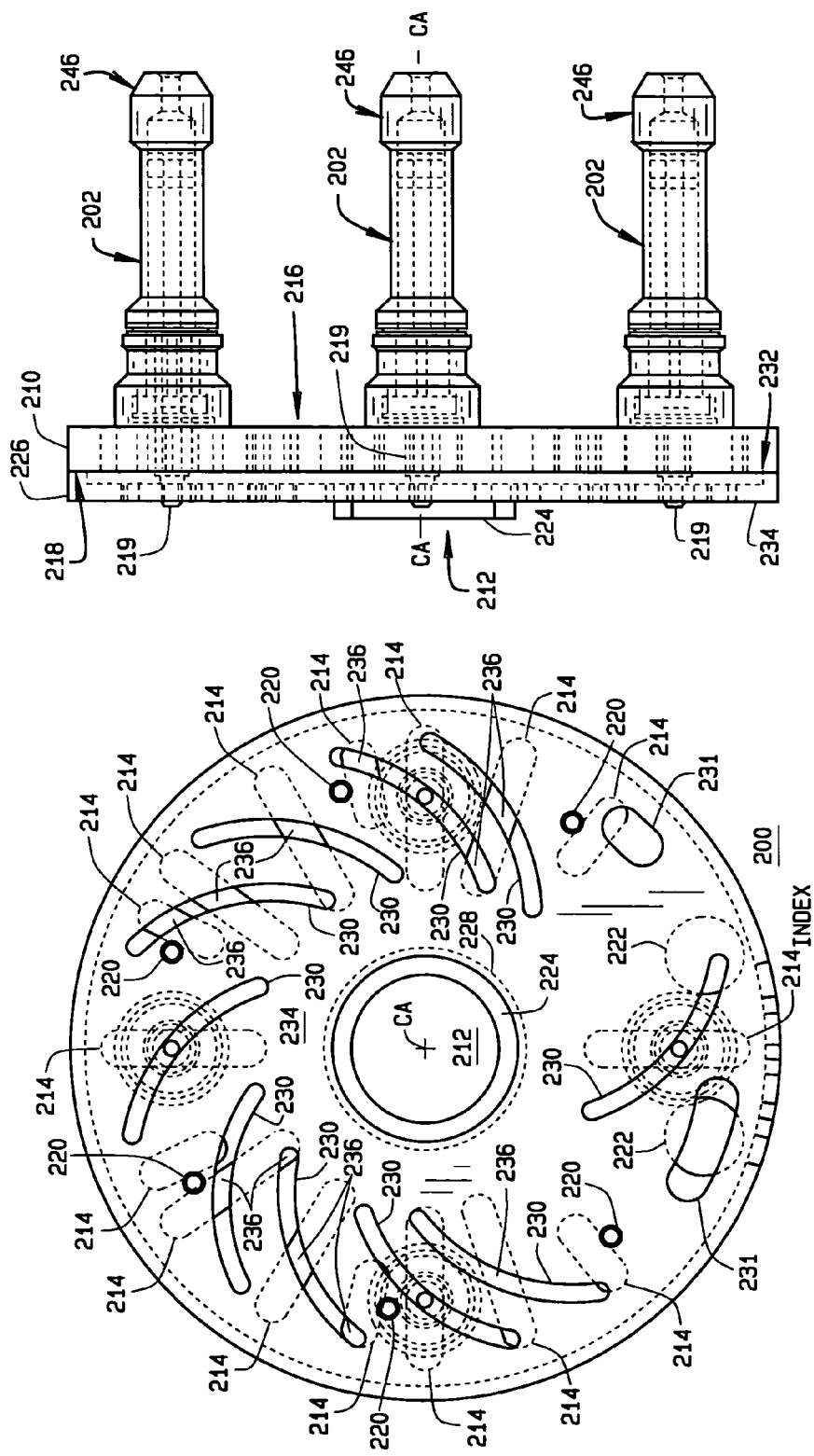

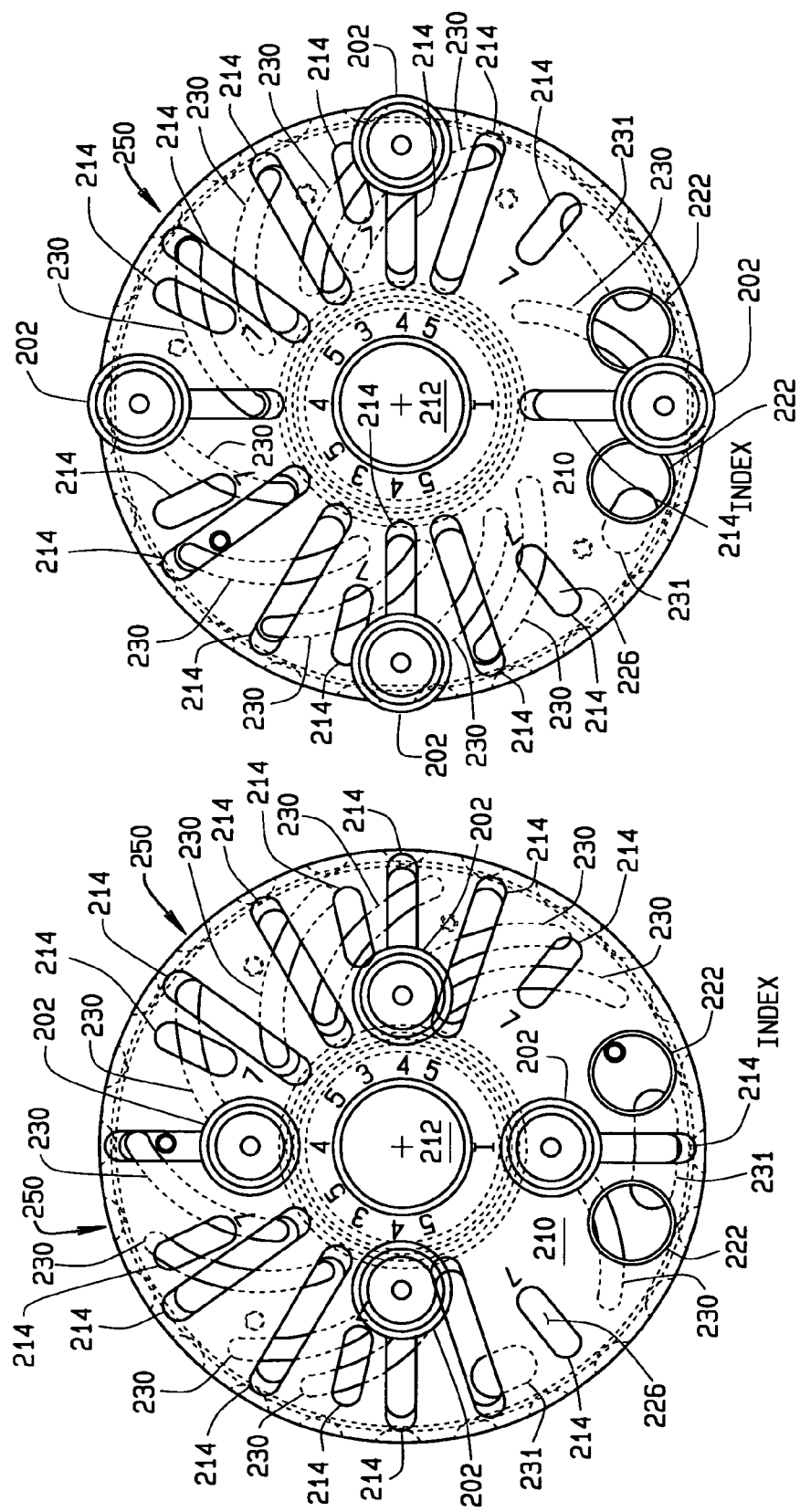

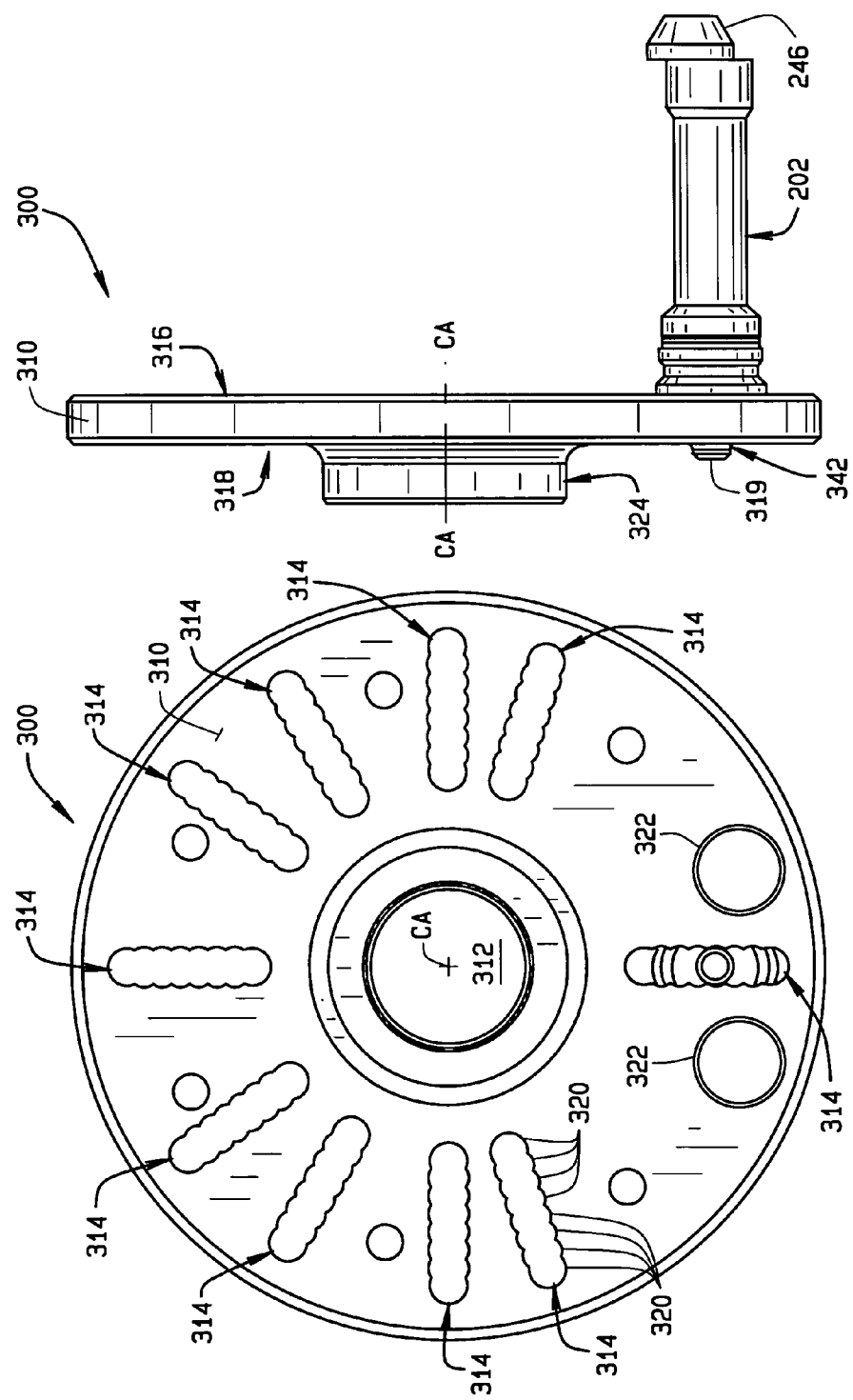

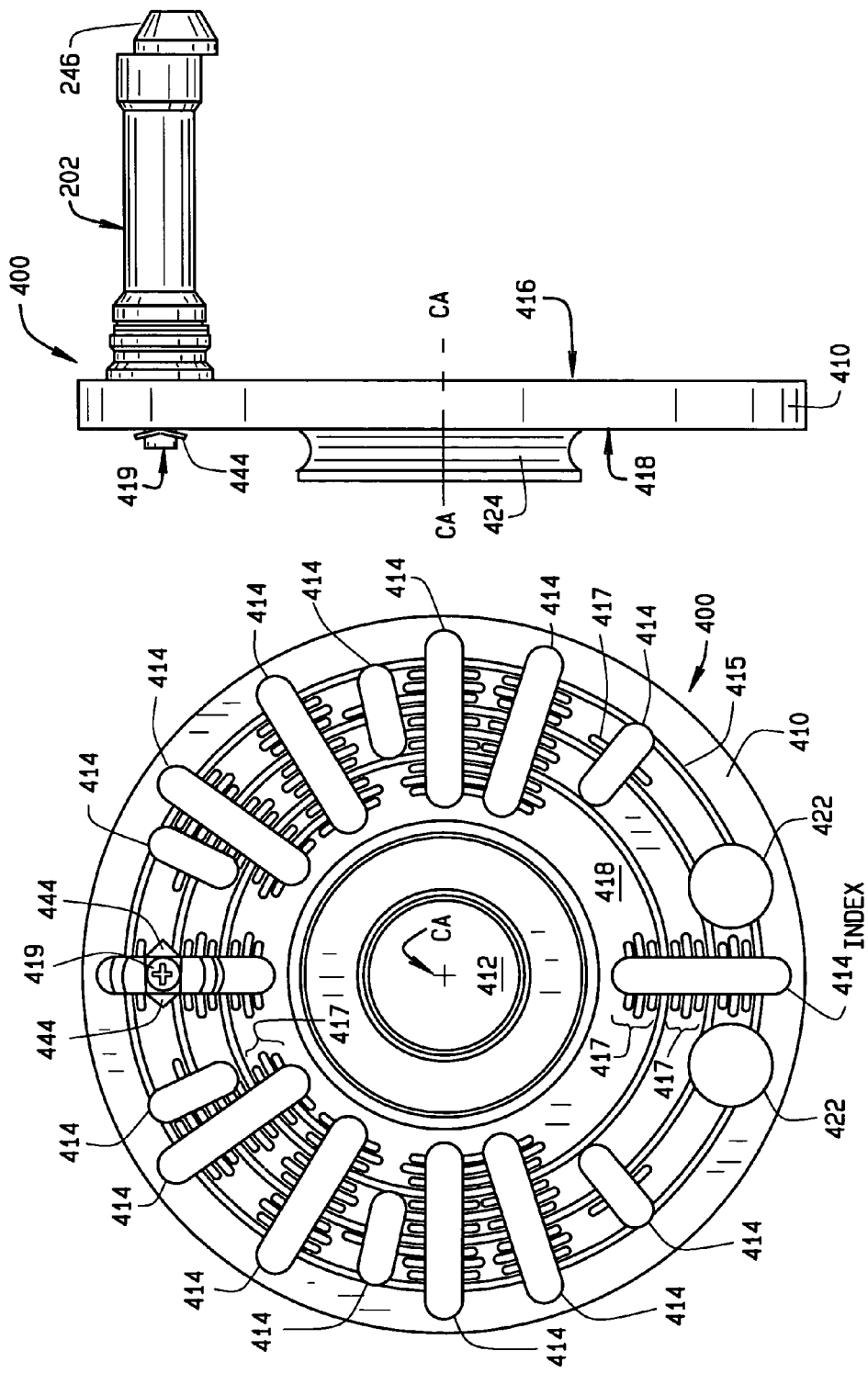

WHEEL COMPONENT CENTERING SYSTEM FOR VEHICLE SERVICE DEVICES

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates generally to vehicle wheel balancer and brake lathe systems, and in particular, to components configured to facilitate the centered mounting of vehicle wheels having a variety of hub pilot hole sizes and lug hole configurations on a vehicle wheel balancer spindle, as well as the centered mounting of a vehicle brake drum or brake rotor onto a brake lathe machine.

A variety of components are utilized to facilitate the centered mounting of vehicle wheels on a vehicle wheel balancer system, and the centered mounting of vehicle brake drums or brake rotors on brake lathes. Centering cones fitted over the spindle shaft of the wheel balancer or brake lathe system provide a center support sized to receive a corresponding hub pilot hole of the wheel, brake rotor, or brake drum. Due to the lack of standardization of hub pilot hole diameters on automobiles, there is a large range of hub pilot hole diameters which centering cones must encompass. A centering cone is configured with an axial bore of uniform diameter, sized to fit over the spindle shaft of the wheel balancer or brake lathe system. To accommodate as many wheels, brake rotors, or brake drums as possible, the outer surface of each cone is tapered to provide a frustoconical surface to receive the inner surface of a hub pilot hole.

It is known to those of ordinary skill in the balancer field that a lower included angle on a centering cone will provide for better centering of an associated wheel, brake rotor, or brake drum. However, to encompass the entire required range of hub pilot hole diameters which are commonly seen in the vehicle service industry with low-included angle centering cones, a greater number of centering cones is required. In order to ensure complete coverage of a range of pilot hole diameters, it is further desirable to provide for some degree of "overlap" in each centering cone. The "overlap" can be defined as the portion of each subsequent centering cone in a set which has the same range of diameters. Alternatively, this can be described as the situation where the major diameter of a centering cone is slightly larger than the minor diameter of the next larger centering cone in the set.

The total number of centering cones required to cover a specific range of hub pilot hole diameters is defined by the angle chosen for the conical taper, the length of the taper, and the amount of overlap desired between each centering cone in the set. Typical centering cones used with automotive service equipment have a single taper on each piece, and a minimum amount of overlap. From here on "taper" will be defined as having all the dimensions necessary to define a frustoconical portion of a cone: maximum diameter, minimum diameter, and the included angle.

Traditionally centering cones have been approximately 1.5" to 2.0" tall. This has been done to minimize the number of cones required to cover a desired range of pilot diameters. Current design trends in automotive wheels are producing many wheels with diameters inside the center bore that are smaller than the pilot diameter. For proper centering it is necessary for the centering cone to contact the wheel on the proper pilot diameter only. Not one of the alternate diameters inside the center bore. This is making it necessary to design centering cones that are shorter than in the past. Many cone manufacturers are releasing many short cones to cover these applications One system for minimizing the number of centering cones required in a set is to utilize centering cones having two opposing tapers on the same unit. These centering cones are of unitary construction, having their maximum diameters centrally disposed, such that the cone is merely reversed on the spindle to switch from one taper to the other. In order to ensure complete coverage for the entire range of pilot hole diameters likely to be encountered during vehicle service, a significant amount of overlap is provided between tapers. However, it has been found that when cones are provide with relatively small included angles, i.e., low taper angles, and small differences in diameters, it becomes difficult for an operator to distinguish one cone from another. The typical method for selecting a suitable cone for use is to look at the pilot hole diameter of the wheel, brake rotor, or brake drum, and make an educated guess as to which cone is most suitable, A trial and error process then ensues until a suitable centering cone is found. Accordingly, it would be highly desirable to provide a method for selecting and identifying suitable centering cones for use in mounting a vehicle wheel, brake rotor, or brake drum on a rotating spindle of a balancer or lathe which does not require extensive trial and error.

Typically, to secure a vehicle wheel to a balancer spindle once it is centered on a centering cone, a flange plate is utilized in conjunction with a tension nut screwed onto the balancer spindle. A conventional flange plate consists of a rigid steel disc with a multitude of holes arranged in axially parallel equally-spaced sets surrounding a central pilot hole, such as shown in U.S. Pat. No. 5,665,911 to Warkotsch. Each set corresponds to a lug circle arrangement commonly found on vehicles, and is adapted to receive a mounting pin. The holes corresponding to different sets are typically identified by one or more forms if identifying indicia, such as shown in U.S. Pat. No. 5,987,761 to Ohnesorge. During use, a mounting pin is positioned in each hole on a flange plate corresponding to the lug circle for a wheel to be secured to a balancer spindle. The wheel is seated on a suitable centering cone on the balancer spindle, and the flange plate fitted onto the spindle. The flange plate is moved down the balancer spindle until each of the mounting pins engages a corresponding lug hole in the vehicle wheel, at which point the tension nut is threaded onto the balancer spindle, clamping the vehicle wheel between the balancer hub and flange plate while being centered by the cone.

An alternate design flange plate is shown in U.S. Pat. No. 6,619,120 to Hansen. This plate is made of a polymeric material and has some amount of radial compliance due to flexing of the plate and its fingers. This design will lack the durability of an adaptor made of hardened steel. Also the pins are either fixed to the plate or they must be placed in discrete locations on the plate thus requiring several plates to cover the desired range of vehicles.

Currently, several flange plates are required in order to cover the wide variety of lug hole configurations found on common vehicle wheels. Lug hole configurations may include four or more holes in a variety of diameters. Accordingly, a technician utilizing a vehicle wheel balancer is required to initially select a suitable flange plate having the proper lug hole spacing and configuration, and then to install the appropriate number of mounting pins in the corresponding holes before securing the vehicle wheel to the balancer spindle. This process must be repeated for each different vehicle wheel mounted on the balancer spindle, leading to a significant amount of time spent in selecting and setting up the appropriate flange plates. Accordingly, it would be highly desirable to provide a flange plate system which may be quickly adjusted to accommodate a wide variety of lug hole patterns, and which is tolerant of a degree of misalignment between the vehicle wheel lug hole pattern and the mounting pin placement to facilitate rapid securing of vehicle wheels to a balancer spindle.

BRIEF SUMMARY OF THE INVENTION

Briefly stated, the preferred embodiment of the present invention provides a system for mounting a vehicle wheel upon a wheel balancer spindle. The system includes a set of double low-taper centering cones arranged and identified according to size. A guide is provided to identify an appropriate centering cone from the set for a given vehicle wheel pilot hole diameter. To secure the vehicle wheel upon the balancer spindle in a centered manner with the selected centering cone, an adjustable mounting assembly is provided, consisting of a flange plate and a set of mounting pins.

In an alternate embodiment of the present invention, a set of double low-taper cones are provided with one or more identifying indicia selected from a set of indicia including colors, annular grooves, numbers, varying diameter rings, varying width rings, and varying width slots. An application guide is provided to correlate vehicle make, model, and year information with a double low-taper cone from the set of cones, identified with the one or more identifying indicia. Preferably, the application guide is in an electronic format.

In an alternate embodiment of the present invention, a method for storing a set of double low-taper cones is provided in which set of cones is stored in a logical arrangement according to taper size, facilitating manual selection of a suitable double low-taper cone for use.

In an alternate embodiment of the present invention, a method for identifying a double low-taper cone from a set of cones is provided. The method includes the step of measuring the pilot hole diameter of a workpiece such as a vehicle wheel, brake rotor, or brake lathe to be centered upon a spindle. The measured pilot hole diameter is correlated with a index of double low-taper cones in the set, and the operator is provided with a visual indication of a preferred cone for use with the measured pilot hole diameter.

In an alternate embodiment of the present invention, an adjustable mounting assembly includes a flange plate and an adjusting plate secured for rotation about a common pilot hole and center axis. The flange plate is configured to guide radial movement of a set of installed mounting pins, while the adjusting plate is configured to actuate the installed mounting pins radially inward and outward in response to rotational movement between the plates. Rotation of the adjusting plate relative to the flange plate results in the mounting pins synchronously traversing the length of radial guide slots in the flange plate, driven by engagement with a set of arcuate slots in the adjusting plate. The mounting pins remain in axially parallel and radially uniform configurations within the ranges defined by the length of the radial slots of the flange plate.

In an alternate embodiment of the present invention, an adjustable mounting assembly is provided including a set of removable mounting pins disposed on a flange plate which are adjustable to accommodate a range of wheel lug hole configurations and diameters. The flange plate includes a plurality of radial slots configured to receive mounting pins in axially parallel equally spaced configurations corresponding to conventional vehicle wheel lug hole patterns. Each radial slot is associated with one or more discrete detents to provide positive placement for each mounting pin at a defined position.

In an alternate embodiment of the present invention, a mounting pin is provided for use with a wheel balancer clamping flange. The mounting pin consists of an annular base, a longitudinal shaft, and a radially compliant tip to accommodate misalignment between the longitudinal shaft and an associated lug hole of a vehicle wheel. The longitudinal shaft is further configured for axial compliance relative to the annular base to accommodate planar irregularities between the wheel balancer clamping flange plate and the plane within which the wheel lug holes are disposed.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a perspective view of a low taper double-cone of the present invention with first and second marking indicia;

FIG. 2 is a perspective view of a low taper double-cone of the present invention with third and fourth marking indicia;

FIG. 5 is a bottom view of an infinitely adjustable mounting flange of the present invention with four conventional mounting pins installed therein;

FIG. 6 is a side view of the infinitely adjustable mounting flange of FIG. 5, with a plurality of conventional mounting pins installed therein;

FIGS. 7A and 7B illustrate the infinitely adjustable mounting flange of FIG. 5 with installed mounting pins in first and second spaced configurations;

FIG. 9 is a bottom view of a mounting flange of the present invention including radial slots with a first detent configuration for placement of conventional mounting pins;

FIG. 10 is a side view of the mounting flange of FIG. 9, with a single mounting pin installed therein;

FIG. 13 is a bottom view of a mounting flange of the present invention including radial slots with a second detent configuration for placement of conventional mounting pins;

FIG. 14 is a side view of the mounting flange of FIG. 13, with a single mounting pin installed therein;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 3:
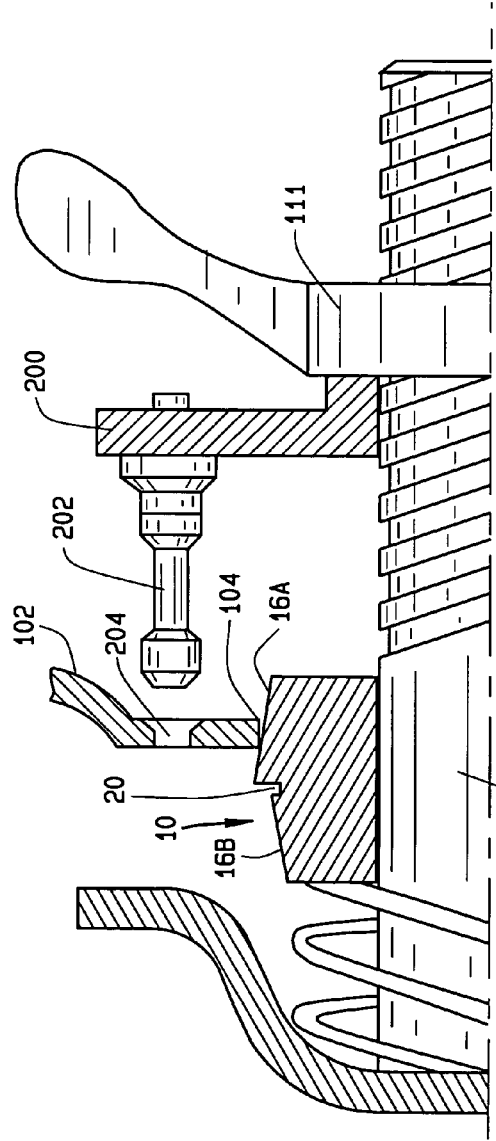
FIG. 3 is a axial section of half of a low taper double-cone of the present invention centering a vehicle wheel on a balancer spindle prior to clamping engagement from a mounting flange.

While the present invention will be described below in the context of a vehicle wheel balancer system, those of ordinary skill in the art will recognize that the methods and apparatus disclosed herein are equally applicable to a variety of systems which require the centered mounting of a rotating body, including, but not limited to, brake rotors and brake drums on brake lathe systems. To provide a system of the present invention with components to center a vehicle wheel upon a wheel balancer spindle for balancing, a set of double low-taper centering centering cones 10 are utilized, such as shown in FIGS. 1 and 2. Each centering cone 10 consists of a unitary cylindrical body 12, having an axial bore 14 of uniform diameter sized to seat on a balancer or lathe spindle 100, such as shown in FIG. 3. The outer surface of the body 12 is consists of a pair of low-taper surfaces 16A, 16B. Each low taper surface has a minimum diameter $D_{min}$ adjacent an end of the body 12, and a maximum diameter $D_{max}$ adjacent a longitudinal midline of the body 12.

Each centering cone 10 is provided with one or more identifying indicia. Turning to FIG. 1, the centering cone 10 illustrated includes as a first indicia, a single circumferential groove 20 disposed between the pair of low-taper surfaces 16A and 16B. The circumferential groove 20 is preferably marked with an identifying color, providing a unique visual identifier to an operator. A second indicia, consisting of a single wide annular channel 22 disposed on an end face 24 of the centering cone 10 is preferably marked with an identifying color, which may be the same as the color provided in the annular groove 20, or distinct there from.

Turning to FIG. 2, additional forms of identifying indicia are shown. Specifically, in FIG. 2, the centering cone 10 is provided with a set of narrow circumferential grooves 20A, 20B disposed between the pair of low-taper surfaces 16A and 16B. Each circumferential groove 20A, 20B is preferably marked with an identifying color to provide the operator with a unique visual identifier for the centering cone 10. A set of narrow annular channels 22A, 22B, and 22C are disposed on an end face 24 of the centering cone 10. Each annular channel is preferably marked with an identifying color, which may be the same as the color provided in the set of circumferential grooves 20A, 20B, or distinct there from.

Those of ordinary skill in the art will recognize that the circumferential grooves 20, annular channels 22, the diameters or widths thereof, and the identifying colors may be utilized in combination or individually to provide a wide range of unique identifying indicia for each centering cone 10. For example, a set of seven centering cones 10, defining a total of 14 low taper surfaces, may be provided with identifying indicia which consists only of single wide annular channels 22 disposed on each end face 24, and filled with unique colors such as red, orange, yellow, green, blue, black, and white. Alternatively, a set of centering cones 10 may be divided into logical subsets of closely related low taper surfaces using combinations of identifying indicia. Similarly, a subset of three related centering cones 10 may be distinguished by a first centering cone 10 of the subset having single circumferential groove 20 with a white color, a second centering cone 10 of the subset having a pair of narrow circumferential grooves 20A and 20B, with a white color, and a third centering cone 10 of the subset having three narrow circumferential grooves 20A, 20B, and 20C with a white color.

Preferably, selection of a centering cone 10 having identifying indicia is facilitated by the use of an application chart or electronic selection guide. For example, for use in centering a vehicle wheel 102 in a vehicle wheel balancer application, such as shown in FIG. 3, it is required to select a centering cone 10 having a tapered surface 16A or 16B which is sufficient to engage the inner surface of a wheel pilot hole 104, thereby centering the vehicle wheel 102 about the centering cone 10, and correspondingly, about the spindle 100 of the balancer upon which the centering cone 10 is mounted. An application chart or electronic selection guide can provide a predetermined table correlating the taper dimensions of centering cones 10 in a set with the pilot hole dimensions of original equipment vehicle wheels optionally identified by vehicle make, model, and year. An operator is required to either look up on a chart, or input to a computer, the identifying vehicle or wheel information, to locate the corresponding centering cone 10 with the identifying indicia.

Figure 4:
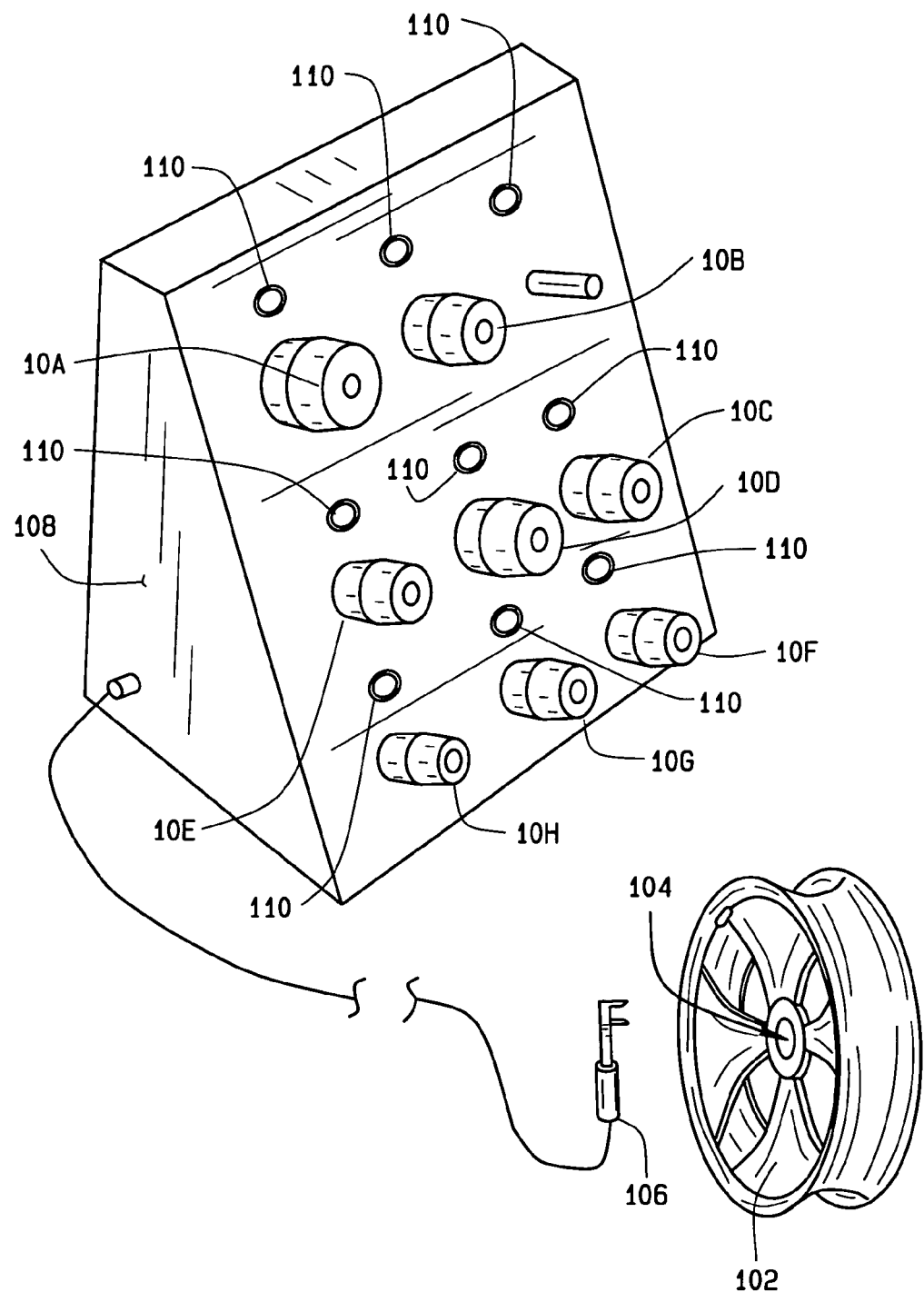
FIG. 4 is a perspective view of a storage rack and indicator system for storing a set of low taper double-cones of the present invention.

An alternate method for selecting a centering cone 10 having a tapered surface 16A or 16B which is sufficient to engage the inner surface of a wheel pilot hole 104 includes utilizing an electronic gauge 106. As shown in FIG. 4, the electronic gauge 106 is used to measure an inner diameter of the wheel pilot hole 104. The electronic gauge is operatively coupled to a storage rack 108 on which a set of centering cones 10A-10H are stored. Adjacent each centering cone 10A-10H on the storage rack 108 is an indicator light 110, and an identifying indicia corresponding to the identifying indicia on an associated centering cone 10A-10H. A processor or logic circuit operatively coupled to the electronic gauge 106 activates the light 110 adjacent a centering cone 10 having a tapered surface dimension corresponding to the wheel pilot hole 104 dimensions obtained with the electronic gauge.

Optionally, the centering cones 10 in a set of cones are stored or arranged on the storage rack 108 in a logically related manner, such that should an operator find that a chosen centering cone 10 has tapered surfaces 16A and 16B which are either too small or too large, the centering cone 10 having the next incremental sizes of tapered surfaces 16A and 16B is readily accessible, preferably stored in an adjacent position on the storage rack 108.

Once a centering cone 10 has been identified or selected, it is mounted on the spindle 100 with the desired tapered surface 16A or 16B facing outward, as shown in FIG. 3. The vehicle wheel 102 is then positioned on the spindle 100, and the wheel pilot hole inner surface seated on the outward-facing tapered surface 16A or 16B of the centering cone 10. To secure the vehicle wheel 102, a vehicle wheel mounting flange assembly 200 having one or more mounting pins 202, is disposed on the spindle 100 and brought into engagement with the vehicle wheel 102, such that each mounting pin 202 seats in an axially aligned lug hole 204. The vehicle wheel mounting flange assembly 200 is clamped against the vehicle wheel 102 using a threaded nut or clamp 111.

Turning to FIGS. 5 and 6, a vehicle wheel mounting flange assembly 200 of the present invention is shown. The vehicle wheel mounting flange assembly 200 consists of a disc-shaped flange plate 210 having an axial pilot hole 212, sized to receive a balancer spindle 100. The outer diameter of the flange plate 210 is greater than the largest diameter of vehicle wheel lug holes 204 for which the flange plate 210 is intended for use. The flange plate 210 includes a plurality of radial slots 214 passing from the front face 216 to the rear face 218, and disposed about the pilot hole 212. One of the radial slots 214 defines an index position $214_{INDEX}$ on the flange plate 210. Those of ordinary skill in the art will recognize that the radial slots 214 may be replaced with groupings of identically skewed or identically arcuate slots covering the desired range of radial measurements.

Preferably, each slot 214 in a subset of radial slots 214 is marked with identifying indicia which may include color, numbers, letters, or surface relief. Subsets of the plurality of radial slots 214 are annularly-spaced equidistantly about the front face 216 of the flange plate 210 from the index position $214_{INDEX}$ in groupings such as at least one subsets of 3, 4, or 5 slots, corresponding to the annular separations of common vehicle wheel lug holes 204. For example, for a subset grouping of four radial slots 214 from the index position $214_{INDEX}$, each radial slot 214 is separated by 90 degrees of rotation about the central axis CA of the mounting flange assembly 200, while each radial slot 214 in a subset grouping of three radial slots 214 is separated by 120 degrees of rotation about the central axis CA. Each radial slot 214 in a subset has a radial length selected to encompass the radial variation in corresponding vehicle wheel lug hole patterns for vehicle wheels 102 of different sizes. For example, each radial slot 214 in a four radial slot subset may have a radial length of 1.0 inches, corresponding to a range vehicle wheels 102 having a four lug patterns from 4.0 inches in diameter to 6.0 inches in diameter. The width of each radial slot 214 is sized to receive a guide pin 219 on the base of a mounting pin 202.

Due to the unequal distribution of the radial slots 214 on the face of the flange plate 210, it is necessary to include one or more counterbalance bores 222 through the flange plate 210 to maintain the flange plate 210 in a rotationally balanced configuration. The placement of the counterbalance bores 222 will vary, depending upon the particular configuration and dimensions of the plurality of radial slots 214.

Those of ordinary skill in the art will recognize that a conventional vehicle wheel balancer is sufficiently sensitive to register any rotational imbalance associated with the flange plate 210, resulting in miscalculation of the imbalance present in the vehicle wheel 102.

Preferably, an annular hub 224 is coaxially disposed about the central bore 212 on the back face 218 of the flange plate 210. An adjusting plate 226 is axially secured about the annular hub 224 by a retaining ring 228. The adjusting plate 226 preferably has the same radial dimension as the flange plate 210, and is free to rotate at least partially about the central axis CA and annular hub 224. Those of ordinary skill in the art will recognize that the adjusting plate 226 may be coaxially secured to the flange plate 210 by means other than an annular hub 224, permitting relative rotational movement there between. For example, an annular retaining ring may be disposed about the outer circumference of both the adjusting plate 226 and the flange plate 210.

As is best seen in FIG. 5, a plurality of arcuate slots 230 are disposed in the adjusting plate 226, extending from a front face 232 to a rear face 234. Each arcuate slot 230 preferably has the same dimensions, and is disposed between a common inner diameter and a common outer diameter on the adjusting plate 226. The number, curvature, and placement of each arcuate slot 230 is selected such that for each radial slot 214 in the flange plate 210, relative rotational movement between the flange plate 210 and the adjusting plate 226 will result in at least one arcuate slot 230 traversing the entire length of each radial slot 214.

Optionally, one or more sets of annularly-spaced and radially-equidistant bores 220 are provided, disposed through the adjusting plate 226 to correspond to an individual vehicle wheel lug hole pattern at a fixed diameter. For example, as shown in FIG. 5, bores 220 are disposed to correspond to the lug hole pattern of a 7-lug vehicle wheel.

Due to the unequal distribution of the arcuate slots 230 on the face of the adjusting plate 226, it is necessary to include one or more counterbalance slots 231 through the adjusting plate 226 to maintain the combined adjusting plate 226 and flange plate 210 in a rotationally balanced configuration. The placement of the counterbalance slots 231 will vary, depending upon the particular configuration and dimensions of the plurality of arcuate slots 230. Those of ordinary skill in the art will recognize that a conventional vehicle wheel balancer is sufficiently sensitive to register any rotational imbalance associated with the combined adjusting plate 226 and flange plate 210, resulting in miscalculation of the imbalance present in the vehicle wheel 102.

The adjusting plate 226 and the flange plate 210 cooperate to define mounting points for a plurality of mounting pins 202 arranged in a set. For each subset of radial slots 214, there exists a relative rotational position between the flange plate 210 and the adjusting plate 226 wherein an arcuate slot 230 and a radial slot 214 cooperatively define an unobstructed passage 236 between the front face 216 of the flange plate 210 and the rear face 234 of the adjusting plate 226 at a common radial distance from the central axis CA in each radial slot 214.

Concentric relative rotation of the adjusting plate 226 with the flange plate 210, and the specific curvature of each arcuate slot 230, results in the synchronous radial displacement of the unobstructed passages 236 from the radially inner end of each radial slot 214 of the selected subset of radial slots, as shown in FIG. 7A, to the radially outermost end of each radial slot 214 of the selected subset of radial slots, as shown in FIG. 7B. As shown in FIGS. 7A and 7B, counterclockwise rotation of the adjusting plate 226 relative to the flange plate 210 moves each mounting pin 202 in a set of four mounting pins 202 from an innermost position corresponding to a 98 mm diameter lug pattern, to an outermost position corresponding to a 170 mm diameter lug pattern. Optionally, a plurality of scalloped recesses 250 are provided around the perimeter of the rear face 234 of the adjusting plate 226 to provide a gripping surface for an operator during rotational adjustment.

To use the vehicle wheel mounting flange assembly 200 of the present invention to secure a vehicle wheel 102 centered on a centering cone 10 about a balancer spindle 100, the vehicle wheel lug pattern is first observed to determine number of lug holes 204. Once the number of lug holes has been identified, a plurality of mounting pins 202 equal to the number of lug holes is selected. A first mounting pin 202 is seated on the mounting flange assembly 200 by passing the guide pin 219 through the unobstructed passage 236 defined by the index radial slot $214_{INDEX}$ and an arcuate slot 230.

Figure 8:
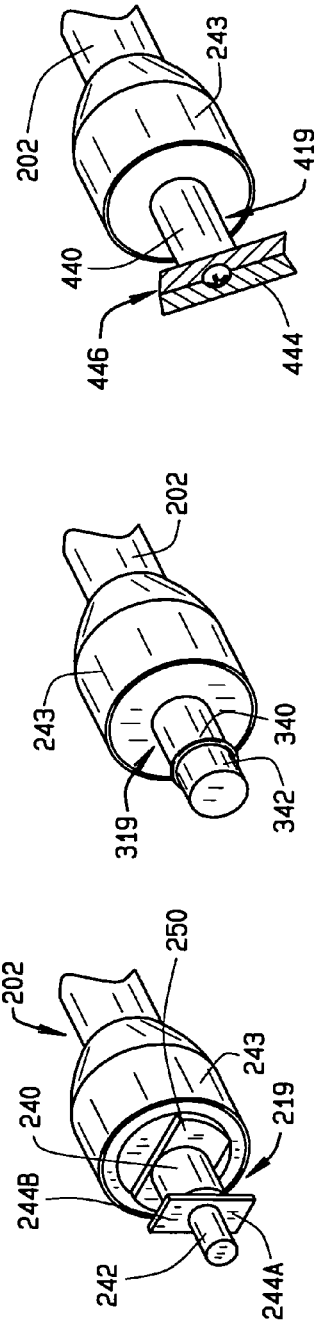
FIG. 8 is a perspective view of the base portion of a mounting pin, illustrating the guide pin and retaining clip components.

Preferably, as shown in FIG. 8, the guide pin 219 consists of a cylindrical base segment 240 and a coaxial reduced diameter cylindrical guide segment 242, extending from an annular base 243. The base segment 240 is sized to seat within a radial slot 214, while the guide segment 242 is sized to seat within an arcuate slot 230. Disposed between the base segment 240 and the guide segment 242 is a pair of rectangular retaining tabs 244A and 244B, which are disposed perpendicular to the axis of the mounting pin 202, in opposite directions. Each retaining tab 244 has a width corresponding to the diameter of the base portion 204, and a length which is approximately twice the width, but which does not exceed the radius of the annular base 243. Optionally, the pair of retaining tabs 244A and 244B may be formed from a single rectangular segment. In an additional optional embodiment, a spring-biased guide 250 is disposed between the annular base 243 and the base segment 240. The guide 250 is sized to seat within a radial slot 214, and is orientated perpendicular to the retaining tabs 244A and 244B. A bias spring disposed within the annular base 243 provides a resilient force on the guide 250, facilitating engagement with a radial slot 214 when the guide pin 219 is seated therein.

With the first mounting pin 202 seated on the mounting flange assembly 200, the guide pin 219 is secured within the unobstructed passage 236 by rotating the mounting pin about a longitudinal axis, such that the retaining tabs 244A and 244B, initially aligned with the radial slot 214, rotate between the flange plate 210 and the adjusting plate 226, engaging the rear face 218, preventing axial movement of the mounting pin 202 within the unobstructed passage 236.

With the first mounting pin 202 in place, the remaining mounting pins 202 of the set are similarly secured to the mounting flange assembly 200 in annularly equidistant unobstructed passages 236 having annular displacement corresponding to the pattern of lug holes 204 on the vehicle wheel 102. Once each mounting pin 202 is secured to the mounting flange assembly 200, the flange plate 210 and adjusting plate 226 are rotated relative to each other about the central axis CA, to actuate simultaneous and uniform radial displacement of the entire set of secured mounting pins 202. The set of mounting pins 202 is radially displaced on the mounting flange assembly 200 by the relative rotation until each mounting pin 202 is radially displaced from the central axis CA of the mounting flange assembly 200 by a distance corresponding to the lug hole axial displacement from the central axis of the balancer spindle 100 or wheel pilot hole 104. Finally, the balancer spindle 100 is passed through the axial pilot hole 212 of the mounting flange assembly 200, and the mounting flange moved towards the previously positioned vehicle wheel 102. Each mounting pin 202 is axially aligned with a lug hole 204 of the vehicle wheel, such that a contact tip 246 on each mounting pin seats in a corresponding lug hole 204. The mounting flange assembly 200 is then urged against the vehicle wheel 102 by the threaded nut or clamp 111 in a conventional manner, securing the vehicle wheel 102 to the balancer spindle 100.

Turning to FIGS. 9 and 10, an alternate embodiment mounting flange of the present invention is shown generally at 300. The vehicle wheel mounting flange 300 consists of a disc-shaped flange plate 310 having an axial pilot hole 312, sized to receive a balancer spindle 100. The outer diameter of the flange plate 310 is greater than the largest diameter of vehicle wheel lug holes 204 for which the flange plate 310 is intended for use. The flange plate 310 includes a plurality of radially adjacent bores 320 of uniform diameter, defining a plurality of incrementally indexed radial positions. Each bore 320 is uniformly spaced from the radially adjacent bores, preferably in 0.1875 inch increments, and may overlap to define a plurality of slots 314 passing from the front face 316 to the rear face 318, and annularly disposed about the pilot hole 312. Preferably, one of the sets of radially adjacent bores 320 defines a slot 314 identified as an index position $314_{INDEX}$ on the flange plate 310. The slots 314 defined by the adjacent bores 320 may be arranged in identical radial, arcuate, or skewed groupings.

While described herein in the context of slots 314 formed from overlapping adjacent bores 320, the advantages and features present invention should be understood to be equally applicable to sets of adjacent bores 320 which do not overlap to form defined slots 314.

Subsets of the plurality of radially adjacent bores 320 or slots 314 are annularly-spaced equidistantly about the front face 316 of the flange plate 310 from the index position $314_{INDEX}$ in groupings such as at least one subsets of 3, 4, or 5, corresponding to the annular arrangements of common vehicle wheel lug holes 204. Preferably, each slot 314 in a subset of slots 314 is marked with identifying indicia which may include color, numbers, letters, or surface relief. For example, for a subset grouping of three slots 314 including the index position $314_{INDEX}$, each slot 314 is separated by 120 degrees of rotation about the central axis CA of the mounting flange 300, while each slot 314 in a subset grouping of four slots 314 is separated by 90 degrees of rotation about the central axis CA. Each slot 314 in a subset has a radial length selected to encompass the radial variation in corresponding lug hole patterns for vehicle wheels 102 of different sizes. For example, each slot 314 in a three radial slot subset may have a radial length of 1.0 inches, defined by eight adjacent bores 320 providing eight incrementally indexed radial positions or discrete detents corresponding to a range of vehicle wheels 102 having a three lug pattern from 4.0 inches in diameter to 6.0 inches in diameter.

The width of each slot 314, established by the diameter of each bore 320, is sized to receive a corresponding guide pin 319 on the base of a mounting pin 202.

Figure 11:
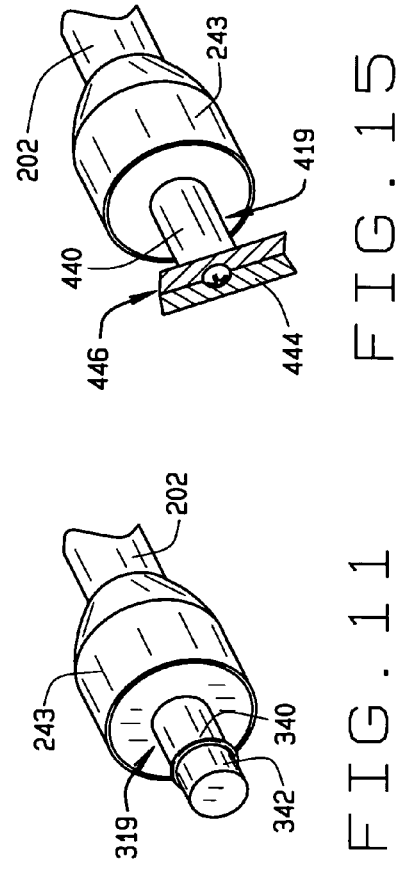
FIG. 11 is a perspective view of the base portion of a mounting pin, illustrating an alternate guide pin configuration.

Each guide pin 319, shown in FIG. 11, consists of a cylindrical base segment 340 and a O-ring 342 disposed about the circumference of the base segment 340. The base segment 340 is sized to seat within a bore 320 defining an incrementally indexed radial position in a slot 314, while the O-ring 342 is sized provide a resilient interference fit with the bore 320. The mounting pin 202 may be seated and removed from each bore 320, as required to provide incremental radial spacing from the central axis CA, corresponding to a lug hole pattern on a vehicle wheel 102.

Due to the unequal distribution of the slots 314 on the face of the flange plate 310, it is necessary to include one or more counterbalance bores 322 through the flange plate 310 to maintain the flange plate 310 in a rotationally balanced configuration. The placement of the counterbalance bores 322 will vary, depending upon the particular configuration and dimensions of the plurality of slots 314. Those of ordinary skill in the art will recognize that a conventional vehicle wheel balancer is sufficiently sensitive to register any rotational imbalance associated with the flange plate 310, resulting in miscalculation of the imbalance present in the vehicle wheel 102.

An annular hub 324 is coaxially disposed about the central bore 312 on the back face 318 of the flange plate 310. The annular hub 324 provides a surface against which a clamp or threaded nut 111 may be tightened.

To use the vehicle wheel mounting flange 300 of the present invention to secure a vehicle wheel 102 centered on a centering cone 10 about a balancer spindle 100, the vehicle wheel lug pattern is first observed to determine number of lug holes 204. Once the number of lug holes has been identified, a plurality of mounting pins 202 equal to the number of lug holes is selected. A first mounting pin 202 is seated on the mounting flange 300 by passing the guide pin 319 through a bore 320 defining the index slot $314_{INDEX}$, at a radial distance from the center axis CA corresponding approximately to the radial distance for the lug holes 204. Preferably, as seen in FIG. 10, and as will be described in detail below, the contact tip 246 of the mounting pin 202 is adjustable relative to the center axis of the mounting pin 202 to accommodate any variation between the defined detent positions of the bores 320 and the actual lug hole patterns. When the mounting pin 202 with an adjustable contact tip 246 is utilized in conjunction with the mounting flange 300, the combination can accommodate an infinite variety of lug hole patterns within the minimum and maximum radial dimensions of the slots 314.

With the first mounting pin 202 in place, the remaining mounting pins 202 of the set are similarly secured to the mounting flange 300 in bores 320 having displacement corresponding to the pattern of lug holes 204 on the vehicle wheel 102. Once each mounting pin 202 is secured to the mounting flange 300, the balancer spindle 100 is passed through the axial pilot hole 312 of the mounting flange 300, and the mounting flange moved towards the previously positioned vehicle wheel 102. Each mounting pin 202 is axially aligned with a lug hole 204 of the vehicle wheel, such that a contact tip 246 on each mounting pin seats in a corresponding lug hole 204. The mounting flange 300 is then urged against the vehicle wheel 102 by the threaded nut or clamp 111 in a conventional manner, securing the vehicle wheel 102 to the balancer spindle 100.

Figure 12:
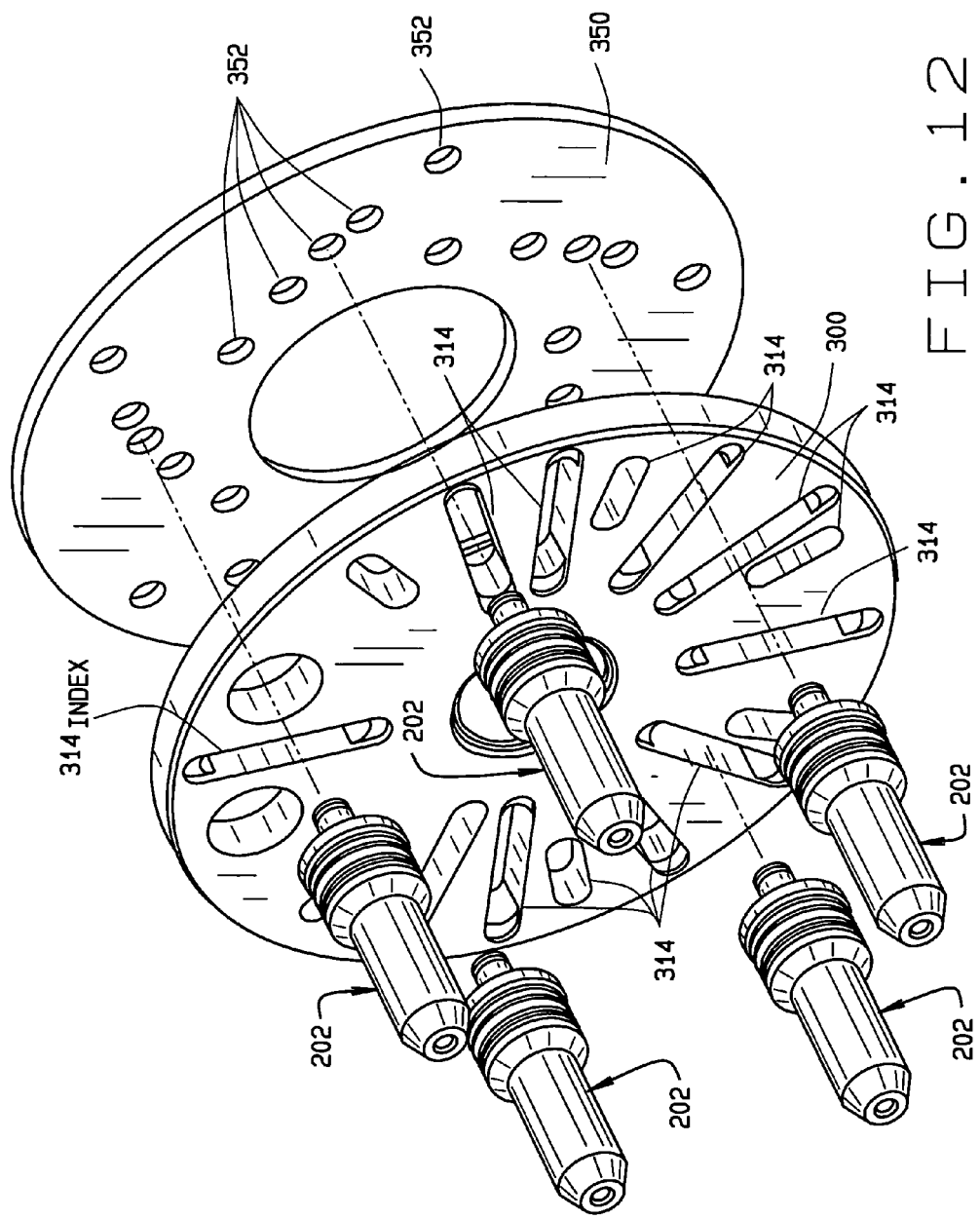
FIG. 12 is a perspective view of an optional guide plate associated with a mounting flange of the present invention to facilitate placement of mounting pins in predetermined vehicle wheel lug hole patterns.

Optionally, as shown in FIG. 12, the placement of the mounting pins 202 in a specific vehicle wheel lug pattern may be guided with the use of a guide plate 350 disposed coaxial with the mounting flange 300. The guide plate 350 may include a plurality of guide holes 352 disposed in one or more predetermined vehicle wheel lug patterns, and may be placed either adjacent the front face 316 or the rear face 318 of the mounting flange 300. The guide plate 350 and the guide holes 352 function to provide a limited set of discrete placement locations for the mounting pins 202 in the slots 314 by obstructing passage of the mounting pins 202 except in the predetermined locations. Preferably, the guide plate 350 is of a lightweight and low-cost manufacture, and may be easily interchanged as required to provide an operator different predetermined vehicle wheel lug hole patterns, thereby facilitating rapid determination of the proper placement of the mounting pins 202.

Turning to FIGS. 13 and 14, an alternate embodiment mounting flange of the present invention is shown generally at 400. The vehicle wheel mounting flange 400 consists of a disc-shaped flange plate 410 having an axial pilot hole 412, sized to receive a balancer spindle 100. The outer diameter of the flange plate 410 is greater than the largest diameter of vehicle wheel lug holes 204 for which the flange plate 410 is intended for use. The flange plate 410 includes a plurality of radial slots 414 passing from the front face 416 to the rear face 418, and annularly disposed about the pilot hole 412. Preferably, one of the radial slots 414 defines an index position $414_{INDEX}$ on the flange plate 410. Those of ordinary skill in the art will recognize that the radial slots 414 may be replaced with groupings of identically skewed or identically arcuate slots covering the desired range of radial measurements.

A plurality of spaced annular grooves 415 and annular groove segments 417 are disposed on the rear face 418, overlapping each radial slot 414. Each annular groove 415 and annular groove segment 417 overlapping a radial slot 414 is radially spaced apart by a uniform distance defining a discrete detent position within the associated radial slot 414.

Subsets of the plurality of radial slots 414 are annularly-spaced equidistantly about the front face 416 of the flange plate 410 from the index position $414_{INDEX}$ in groupings including at least one subsets of 3, 4, or 5, slots, corresponding to the annular separations of common vehicle wheel lug holes 204. Preferably, each slot 414 in a subset of radial slots 414 is marked with identifying indicia which may include color, numbers, letters, or surface relief.

For example, for a subset grouping of three radial slots 414 from the index position $414_{INDEX}$, each radial slot 414 is separated by 120 degrees of rotation about the central axis CA of the mounting flange 400, while each radial slot 414 in a subset grouping of four radial slots 414 is separated by 90 degrees of rotation about the central axis CA. Each radial slot 414 in a subset has a radial length selected to encompass the radial variation in corresponding lug hole patterns for vehicle wheels 102 of different sizes. For example, each radial slot 414 in a three radial slot subset may have a radial length of 1.0 inches, and is overlapped on the rear face 418 by three or more annular grooves 415 or annular segments 417, providing at least three discrete detent positions which are disposed in incremental radial locations corresponding to a range vehicle wheels 102 having a three lug patterns from 4.0 inches in diameter to 6.0 inches in diameter. The width of each radial slot 414 is sized to receive a corresponding guide pin 419 on the base of a mounting pin 202.

Figure 15:
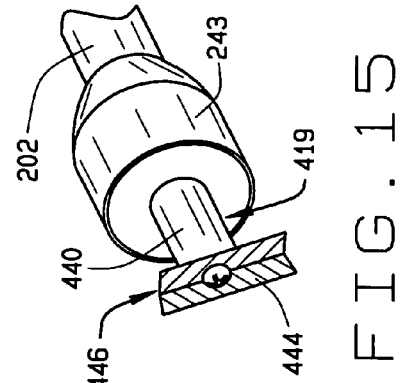
FIG. 15 is a perspective view of the base portion of a mounting pin, illustrating an alternate guide pin and retaining clip components.

Preferably, as shown in FIG. 15, the guide pin 419 consists of a cylindrical base segment 440 coaxial with the mounting pin 202 and sized to seat within a radial slot 414. Disposed on the end face of the base segment 240, opposite the mounting pin 202, is a spring tab 444 orientated perpendicular to the axis of the mounting pin 202 and resiliently biased in an axial direction. The spring tab 444 has a width corresponding to the diameter of the base segment 204, and a length which is approximately twice the width, but does not exceed the diameter of the annular base 243. A longitudinal crease 446 extending the length of the spring tab 444 is sized and orientated to engage with the resilient bias an annular groove 415 or annular segment 417 on the back face 418 of the flange plate 410 when the guide pin 419 is passed through a radial slot 414 and rotated 90 degrees, thereby providing a positive engagement between the mounting pin 202 and flange plate 410 in one of a plurality of incremental radial positions.

Due to the unequal distribution of the radial slots 414 on the face of the flange plate 410, it is necessary to include one or more counterbalance bores 422 through the flange plate 410 to maintain the flange plate 410 in a rotationally balanced configuration. The placement of the counterbalance bores 422 will vary, depending upon the particular configuration and dimensions of the plurality of radial slots 414.

Those of ordinary skill in the art will recognize that a conventional vehicle wheel balancer is sufficiently sensitive to register any rotational imbalance associated with the flange plate 410, resulting in miscalculation of the imbalance present in the vehicle wheel 102.

An annular hub 424 is coaxially disposed about the central bore 412 on the back face 418 of the flange plate 410. The annular hub 424 provides a surface against which a clamp or tensioning nut 111 may be tightened.

To use the vehicle wheel mounting flange 400 of the present invention to secure a vehicle wheel 102 centered on a centering cone 10 about a balancer spindle 100, the vehicle wheel lug pattern is first observed to determine number of lug holes 204. Once the number of lug holes has been identified, a plurality of mounting pins 202 equal to the number of lug holes is selected. A first mounting pin 202 is seated on the mounting flange 400 by passing the guide pin 419 and spring tab 444 through the index radial slot $414_{INDEX}$, at a radial distance from the center axis CA corresponding approximately to the radial distance for the lug holes 204. Preferably, as seen in FIG. 14, and as will be described in detail below, the contact tip 246 of the mounting pin 202 is adjustable relative to the center axis of the mounting pin 202 to accommodate any variation between the defined detent positions of the radial slots 414 and the actual lug hole patterns. When the mounting pin 202 with an adjustable contact tip 246 is utilized in conjunction with the mounting flange 400, the combination can accommodate an infinite variety of lug hole patterns within the minimum and maximum radial dimensions of the slots 414.

With the first mounting pin 202 seated on the mounting flange 400, the guide pin 319 is secured by rotating the mounting pin about a longitudinal axis, such that the longitudinal crease 446 of the spring tab 444, initially aligned with the radial slot 414, rotates perpendicular to the radial slot 414 and seats within an annular groove 415 or annular segment 417 overlapping the radial slot 414 at a desired radial distance from the center axis CA. The engagement of the longitudinal crease 446 with the groove 415 or segment 417 prevents axial movement of the mounting pin 202 within the radial slot 414, and provides positive detent positions for radial movement.

With the first mounting pin 202 in place, the remaining mounting pins 202 of the set are similarly secured to the mounting flange 400 in radial slots 414 having displacement corresponding to the pattern of lug holes 204 on the vehicle wheel 102. Once each mounting pin 202 is secured to the mounting flange 400, the balancer spindle 100 is passed through the axial pilot hole 412 of the mounting flange 400, and the mounting flange moved towards the previously positioned vehicle wheel 102. Each mounting pin 202 is axially aligned with a lug hole 204 of the vehicle wheel, such that a contact tip 246 on each mounting pin seats in a corresponding lug hole 204. The mounting flange 400 is then urged against the vehicle wheel 102 by the threaded nut or clamp 111 in a conventional manner, securing the vehicle wheel 102 to the balancer spindle 100.

As previously described in FIGS. 8, 11, and 15, mounting pins 202 may include a variety of guide pins 219, 319, and 419 depending upon the particular mounting flange assembly 200, 300, or 400 for which the mounting pin 202 is to be utilized. To accommodate a variety of conditions commonly associated with vehicle wheels 102, and to match an infinite variety of wheel lug hole patterns within the limited radial range of the various mounting flanges, the mounting pins 202 may be constructed to be compliant in an axial direction and/or in a radial direction.

Figure 16:
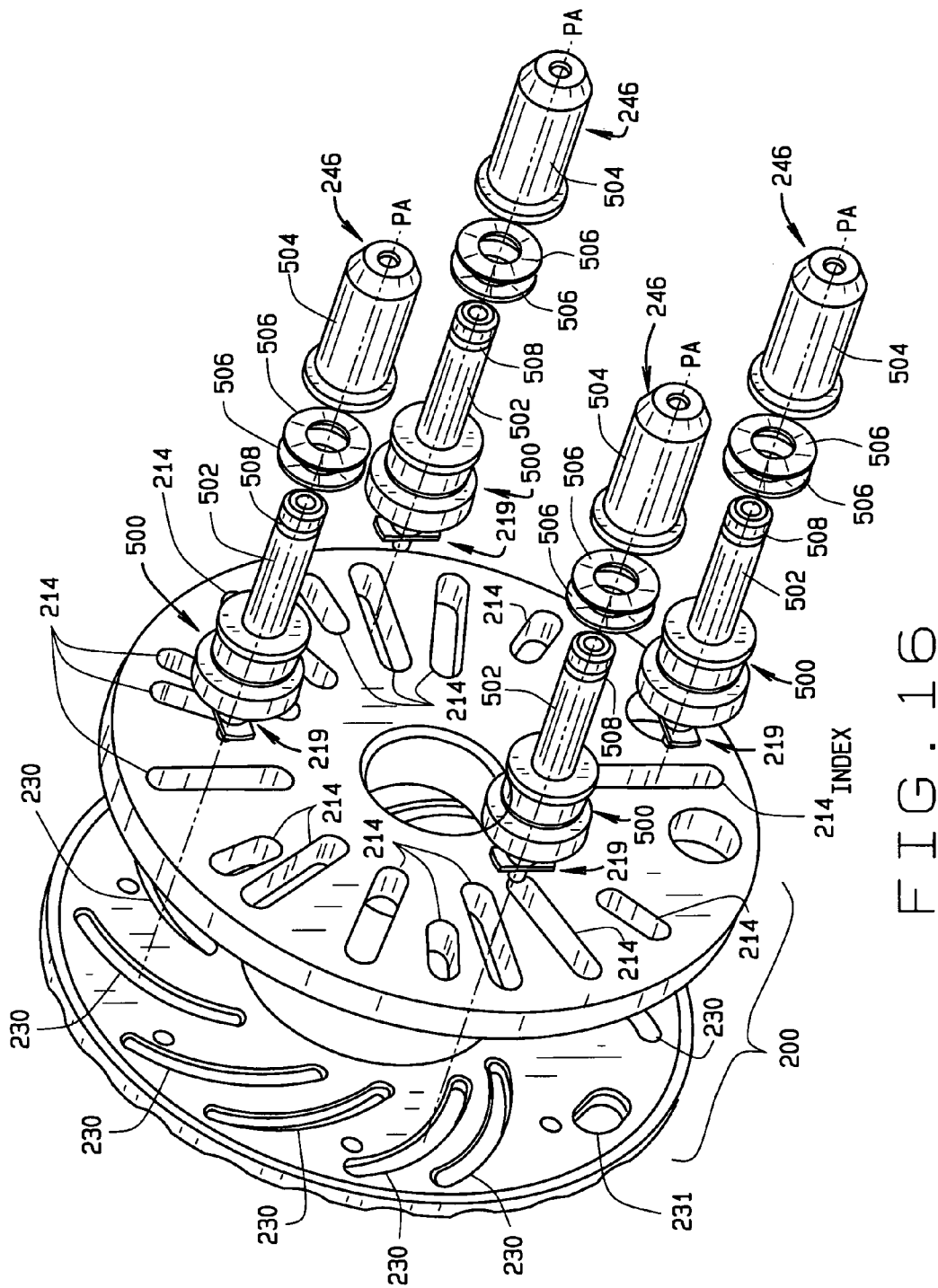
FIG. 16 is an exploded view of a set of axially compliant mounting pins of the present invention installed on the mounting flange of FIG. 5.

Turning to FIG. 16, a set of four mounting pins 202 of the present invention are shown in exploded view, associated with a mounting plate 200 of the present invention. Each mounting pin 202 consists of a cylindrical base 500 having a longitudinal axis PA. A guide pin 219, previously described, projects from a rear face of the base 500. A guide shaft 502, which may be integrally formed with the guide pin 219, projects from a front face of the base 500 for receiving a cylindrical sleeve 504. As shown in FIG. 15, the contact tip 246 is optionally integrally formed with the cylindrical sleeve 504.

To provide axial compliance for the contact tip 246 along the axis PA of the mounting pin 202, one or more compliance components 506, such as Belleville washers, are disposed about the guide shaft 502 between the sleeve 504 and the base 500. A limited degree of axial compliance is desired when utilizing a mounting flange to secure a vehicle wheel 102 to a balance spindle 100 to accommodate for any variances or misalignment between a plane defined by the vehicle wheel lug holes and a plane defined by the ends of the mounting pins 202 which seat in the lug holes. Without a limited degree of axial compliance, the act of clamping or securing the vehicle wheel 102 to the balancer spindle with the mounting flange and contact pins may distort the vehicle wheel 102 or prevent the centered mounting thereof.

Preferably, the sleeve 504 is operatively secured to the guide shaft 502 by an interference fit provided by one or more O-rings 508, permitting the sleeve 504 to be removed from the guide shaft 502. For example, the sleeve 504 and integrated contact tip 246 may be replaced with different styles of sleeves and contact tips, corresponding to the type of vehicle wheel 102 with which the mounting pin 202 is intended to engage.

Figure 17:
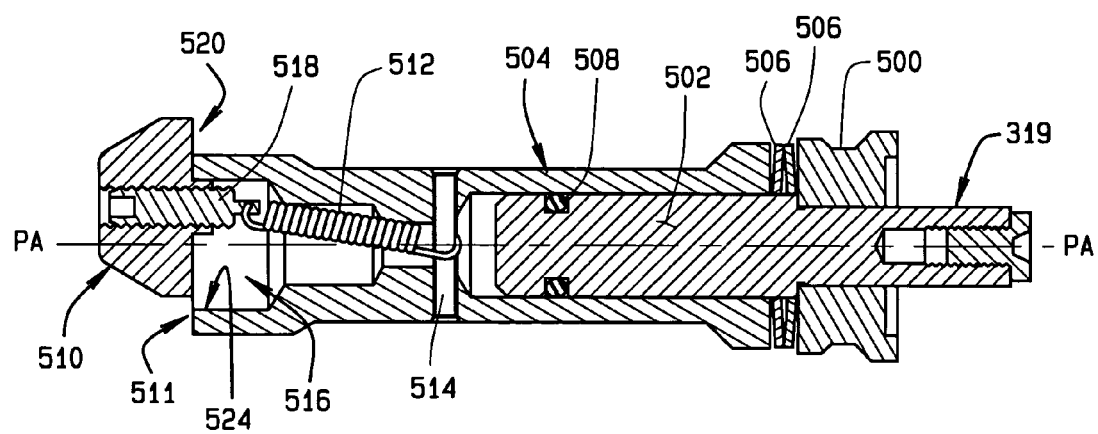
FIG. 17 is a sectional view of a mounting pin of the present invention incorporating sliding spring-retained head.

When a vehicle wheel balancer system utilizes a mounting flange only providing discrete mounting pin placement locations, such as shown in FIG. 9 and FIG. 13, it is desirable to provide a mounting pin 202 which can accommodate a limited degree of radial compliance for seating in vehicle wheel lug holes 204. In an alternate embodiment mounting pin 202 of the present invention, shown in FIG. 17, the fixed contact tip 246 is replaced with a sliding contact tip 510.

Sliding contact tip 510 is maintained in axial contact with an end face 511 of the sleeve 504 by a retaining spring 512 coupled between a pin 514 disposed in an axial bore 516 within the sleeve 504, and an eyelet 518 projecting from the base 520 of the sliding contact tip 510 within the axial bore 516. Retaining spring 512 exerts an axial load on the sliding contact tip 510, maintaining contact with the sleeve end face 511, but does not significantly impair a limited range of radial motion across the sleeve end face 511. The radial motion of the sliding contact tip 510 is limited by engagement of an annular hub 522 protruding from the base 520 with the inner perimeter surface 524 of the axial bore 516. Preferably, the sliding contact tip 510 has a limited range of radial motion which is sufficient to overlap between adjacent placement positions of the mounting stud 202 on a mounting flange 300 or 400, thereby providing accommodating an infinite range of wheel lug radial placements within the minimum and maximum radial dimension accommodate by the mounting flange. Optionally, to provide axial compliance for the contact tip 246 along the axis PA of the mounting pin 202, one or more compliance components 506, such as Belleville washers, are disposed about the guide shaft 502 between the sleeve 504 and the base 500.

Those of ordinary skill in the art will recognize that a variety of attachment means may be utilized to maintain the sliding contact tip 510 in axial contact and sliding relationship with the end face 511 of the sleeve 504. For example, in an alternative embodiment, magnetic components may be utilized to employ axially aligned magnetic forces to maintain the required axial contact while permitting sliding radial motion of the sliding contact tip 510, eliminating the requirement for mechanical attachments.

Figure 18:
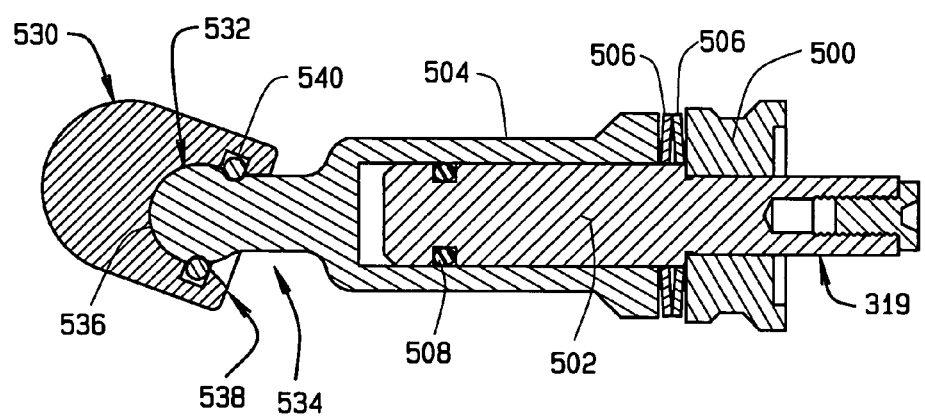
FIG. 18 is a sectional view of a mounting pin of the present invention incorporating ball and socket head.

In an alternate embodiment mounting pin 202 of the present invention, shown in FIG. 18, the sliding contact tip 510 is replaced with a hemispherical tip 530 mounted on a ball and socket joint 532. Preferably, a ball component 534 is integrally formed axially on the end of the sleeve 504, opposite from the guide pin 319. the ball component 534 is engaged with a socket 536 integrally formed in the base 538 of the spherical tip 530. On O-ring 540 seated within the socket 536 provides a resilient coupling between the ball component 534 and socket 536, permitting the spherical tip 530 to be removed from the ball component 534 for replacement.

Articulating motion of the hemispherical tip 530 about the ball and socket joint 523 effectively provides a limited range of radial displacement for the mounting pin 202 by shifting a contact region between the mounting pin 202 and a wheel lug hole 204 about the outer surface of the spherical tip 530. Preferably, the spherical tip 530 has a limited range of articulating motion which is sufficient to overlap radial between adjacent placement positions of the mounting stud 202 on a mounting flange 300 or 400, thereby providing accommodating an infinite range of wheel lug radial placements within the minimum and maximum radial dimension accommodate by the mounting flange. Optionally, to provide axial compliance for the contact tip 246 along the axis PA of the mounting pin 202, one or more compliance components 506, such as Belleville washers, are disposed about the guide shaft 502 between the sleeve 504 and the base 500.

Those of ordinary skill in the art will recognize that components of the mounting pins 202 of the present invention may be interchanged and utilized in a variety of configurations. For example, the sleeves 504 may be replaced with sleeves having different lengths to accommodate different configurations of vehicle wheels 102. Similarly, mounting pins 202 with sliding or articulating contact tips may be utilized with the infinitely adjustable mounting flange assembly 200 of the present invention in place of mounting pins 202 with fixed contact tips, as previously described. Mounting pins 202 incorporating the sliding or articulating contact tips are particularly useful to accommodate vehicle wheels 102 wherein one or more lug holes 204 are not disposed at a uniform radial distance from an axial centerline, or which have been enlarged due to damage or wear.

It will be further recognized that the fixed, sliding, and articulating contact tips shown in the present invention may be replaced with fixed, sliding, or articulating contact tips having a variety of different outer surface features, as required to engage specific vehicle wheel lug holes, without departing from the scope of the present invention.

Those of ordinary skill in the art will recognize that the wheel balancer wheel centering, mounting, and clamping components described herein may be utilized as components in a system for centering, mounting, and clamping vehicle wheels or other rotating bodies onto a rotating shaft, such as a balancer spindle or lathe spindle. The system of the present invention preferably includes a set of double low-tapers cones 10 arranged and identified according to taper sizes. A guide or application chart is provided to identify an appropriate centering cone 10 from the set for a given vehicle wheel pilot hole inner diameter. To secure the vehicle wheel upon the balancer spindle 100 in a centered manner with the selected centering cone 10, an flange plate 200, 300, or 400 is provided with a set of mounting pins 202 having contact tips for engaging the vehicle wheel lug holes 204. The combination of the flange plate and mounting pins 202 provides for infinite adjustment of the mounting pin contact tips within a predetermined range, accommodate any of a variety of vehicle wheel lug hole patterns. With the centering cone 10 and wheel 104 positioned on the balancer spindle 100, the mounting flange plate 200, 300, or 400 is positioned on the spindle 100, and the mounting pins 202 disposed in corresponding engagement with the wheel lug holes 204. A threaded nut or clamp 111 is then positioned on the spindle 100, and tightened to clamp the mounting flange plate and mounting pins 202 against the wheel 104, centering it on the centering cone 10 for balancing.

The present invention can be embodied in-part in the form of computer-implemented processes and apparatuses for practicing those processes. The present invention can also be embodied in-part the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A system for mounting vehicle wheels, each having an axial pilot hole and a plurality of radially spaced lug holes disposed in one of a plurality of symmetric and axially centered configurations, about a spindle shaft of a vehicle wheel balancer, comprising:

a single mounting flange assembly configured for placement on the spindle shaft, said single mounting flange assembly including a flange plate, a coaxially mounted adjusting plate coupled for coaxial rotational movement relative to said flange plate about a central axis, and a plurality of mounting pins, each of said plurality of mounting pins including a guide pin adapted for engagement with said flange plate and said adjusting plate, and a contact tip adapted for engagement with the plurality of radially spaced lug holes;

wherein said single mounting flange assembly is configured to provide infinite radial adjustment of said contact tips about the spindle shaft between a minimum radial dimension and a maximum radial dimension to engage each of the plurality of radially spaced lug holes for a plurality of symmetric and axially centered vehicle wheel lug hole configurations, each lug hole configuration having a different number of lug holes;

wherein said flange plate is configure to receive each of said plurality of guide pins in an associated slot in a first plurality of slots having a first common configuration selected from a set of configurations including radial, arcuate, and skewed; and wherein said adjusting plate is configured to concurrently receive each of said guide pins in an associated slot in a second plurality of slots having a second common figuration which differs from said first common configuration, and which is selected from said set of configurations.

2. The system of claim 1 for mounting a vehicle wheel wherein said plurality of slots in each of said adjusting plate and said flange plate cooperatively defining a plurality of radially spaced unobstructed passages configured to receive said mounting pin guide pins; and wherein rotational movement of said adjusting plate relative to said flange plate alters a radial position of each of said unobstructed passages.

3. The system of claim 1 wherein said first and second pluralities of slots cooperatively define at least one set of unobstructed passages through said flange plate and adjusting plate, each set of unobstructed passages corresponding to a symmetric and axially centered vehicle wheel lug hole configuration; and wherein each of said unobstructed passages in a set of unobstructed passages is configured to receive a guide pin and is disposed at a common radial distance from an axis, said common radial distance associated with a rotational position of said adjusting plate.

4. The system of claim 3 wherein a range of rotational movement of said adjusting plate about said central axis corresponds with a range of radial movement of each of said unobstructed passages in said set of unobstructed passages between an inner radial position and an outer radial position.

5. The system of claim 1 wherein said first plurality of slots passing through said flange plate have a radial configuration;

said second plurality of slots passing through said adjusting plate have an arcuate configuration;

wherein said first and second pluralities of slots cooperatively define at least one set of unobstructed passages through said flange plate and adjusting plate, each set corresponding to a symmetric and axially centered vehicle wheel lug hole configuration; and wherein each of said unobstructed passages in a set of unobstructed passages is configured to receive a guide pin and is disposed at a common radial distance from an axis, said common radial distance associated with a rotational position of said adjusting plate.

6. The system of claim 3 wherein said first plurality of slots passing through said flange plate includes a plurality of sets of circumferentially equidistant spaced slots; and wherein said second plurality of slots passing through said adjusting plate include a plurality of sets of circumferentially equidistant spaced slots, each set of slots passing through said adjusting plate associated with a set of slots passing through said flange plate.

7. A system for mounting vehicle wheels, each having an axial pilot hole and a plurality of radially spaced lug holes disposed in one of a plurality of symmetric and axially centered configurations, about a spindle shaft of a vehicle wheel balancer, comprising:

a single mounting flange assembly configured for placement on the spindle shaft, said single mounting flange assembly including a flange plate and a plurality of mounting pins, each of said plurality of mounting pins including a guide pin adapted for engagement with said flange plate and a contact tip adapted for engagement with the plurality of radially spaced lug holes;

wherein said single mounting flange assembly is configured to provide infinite radial adjustment of said contact tips about the spindle shaft between a minimum radial dimension and a maximum radial dimension to engage the plurality of radially spaced lug holes for a plurality of symmetric and axially centered configurations each having a different number of lug holes; and at least one double-tapered centering cone having a first tapered surface increasing in diameter from a first end, and a second tapered surface increasing in diameter from a second end axially opposite said first end, said double-tapered centering cone configured for placement on the spindle shaft and having an identifying indicia.

8. The system of claim 7 wherein said at least one centering cone further includes:

a central hole in said centering cone for axially guiding said centering cone on the spindle shaft;

a first tapered outer surface having a first minimum diameter adjacent a first end of said centering cone; and a second tapered outer surface having a second minimum diameter adjacent a second end of said centering cone, opposite said first end.

9. A single adjustable mounting flange system for mounting a variety of vehicle wheels, each having a different lug pattern, on the spindle shaft of a balancing machine, comprising:

a flange plate having a central bore extending from a front face to a rear face;

an adjusting plate disposed adjacent said rear face and coupled to said flange plate for coaxial rotational movement relative to said flange plate;

a plurality of slots having a first common configuration and first orientation passing through said flange plate;

a plurality of slots having a second common configuration and second orientation passing through said adjusting plate; and wherein said plurality of slots in said flange plate and said plurality of slots in said adjusting plate cooperatively define a plurality of axially symmetric sets of unobstructed passages through said adjustable mounting flange, each of said axially symmetric sets including at least three unobstructed passages and corresponding to each lug hole in a different wheel lug pattern; and wherein each of said unobstructed passages in each of said axially symmetric sets is disposed at a common radial distance from an axis of said central bore, said common radial distance associated with a rotational position of said adjusting plate.

10. The adjustable mounting flange system of claim 9 wherein said plurality of slots passing through said flange plate include at least one set of circumferentially equidistant spaced slots, and wherein said first common configuration is selected from a set of configurations including radial, arcuate, or skewed; and wherein said plurality of slots passing through said adjusting plate include at least one set of circumferentially equidistant spaced slots, and wherein said second common configuration is selected from a set of configurations including radial, arcuate, or skewed and which is different from said first common configuration of said slots in said flange plate.

11. The adjustable mounting flange system of claim 9 wherein each of said unobstructed passages is configured to receive a mounting pin.

12. The adjustable mounting flange system of claim 9 wherein a range of rotational movement of said adjusting plate about said central axis corresponds with a range of radial movement of each of said unobstructed passages in said set of unobstructed passages between an inner radial position and an outer radial position.

13. The adjustable mounting flange system of claim 9 wherein each of said sets of slots passing through said flange plate are disposed in annular patterns corresponding to different annular patterns of vehicle wheel lug holes; and
wherein each of said sets of slots passing through said adjusting plate are disposed in annular patterns corresponding to said different annular patterns of vehicle wheel lug holes.

14. The adjustable mounting flange system of claim 13 wherein each slot in a subset includes identifying indicia associated with said respective subset.

15. A method for securing a vehicle wheel having a plurality of lug holes on the spindle of a balancing machine with the single adjustable mounting flange assembly of claim 9, comprising the steps of:
identifying a lug hole pattern on the vehicle wheel;
rotationally aligning said adjusting plate with said flange plate such that at least one of said axially symmetric sets of unobstructed passages through said adjustable mounting flange corresponds to each lug hole present in said identified lug hole pattern;
installing a plurality of mounting pins in each unobstructed passage in said aligned set of unobstructed passages;
disposing, on said balancer spindle, a tapered centering cone having at least a first tapered surface sized for concentric seating within said vehicle wheel pilot hole;
positioning the pilot hole of the vehicle wheel about said tapered centering cone on the balancer spindle;
mounting said adjustable mounting flange on the balancer spindle;
aligning each of said plurality of mounting pins with a lug hole on the vehicle wheel; and
urging said mounting flange towards said vehicle wheel and tapered centering cone, engaging each of said plurality of mounting pins with said lug holes, whereby said vehicle wheel is seated on said tapered centering cone and centrally secured about said balancer spindle.

16. The method of claim 15 for securing a vehicle wheel wherein the step of aligning further includes the step of rotating said adjusting plate relative to said flange plate, whereby a radial position of each of said mounting pins is altered.

17. The method of claim 16 for securing a vehicle wheel wherein each of said mounting pins has a common radial position; and wherein said radial position of each of said mounting pins is altered simultaneously and equally.

18. The adjustable mounting flange assembly of claim 9 wherein said plurality of slots passing through said flange plate include at least one set of circumferentially equidistant slots in a radial configuration; and
wherein said plurality of slots passing through said adjusting plate include at least one set of circumferentially equidistant slots in an arcuate configuration.

* * * * *